June 24, 1941.  J. H. FEDELER  2,247,119
AIR CONDITIONING APPARATUS
Filed Oct. 27, 1938  3 Sheets-Sheet 1

INVENTOR
JOHN H. FEDELER
BY
Gifford, Scull & Burgess
ATTORNEYS

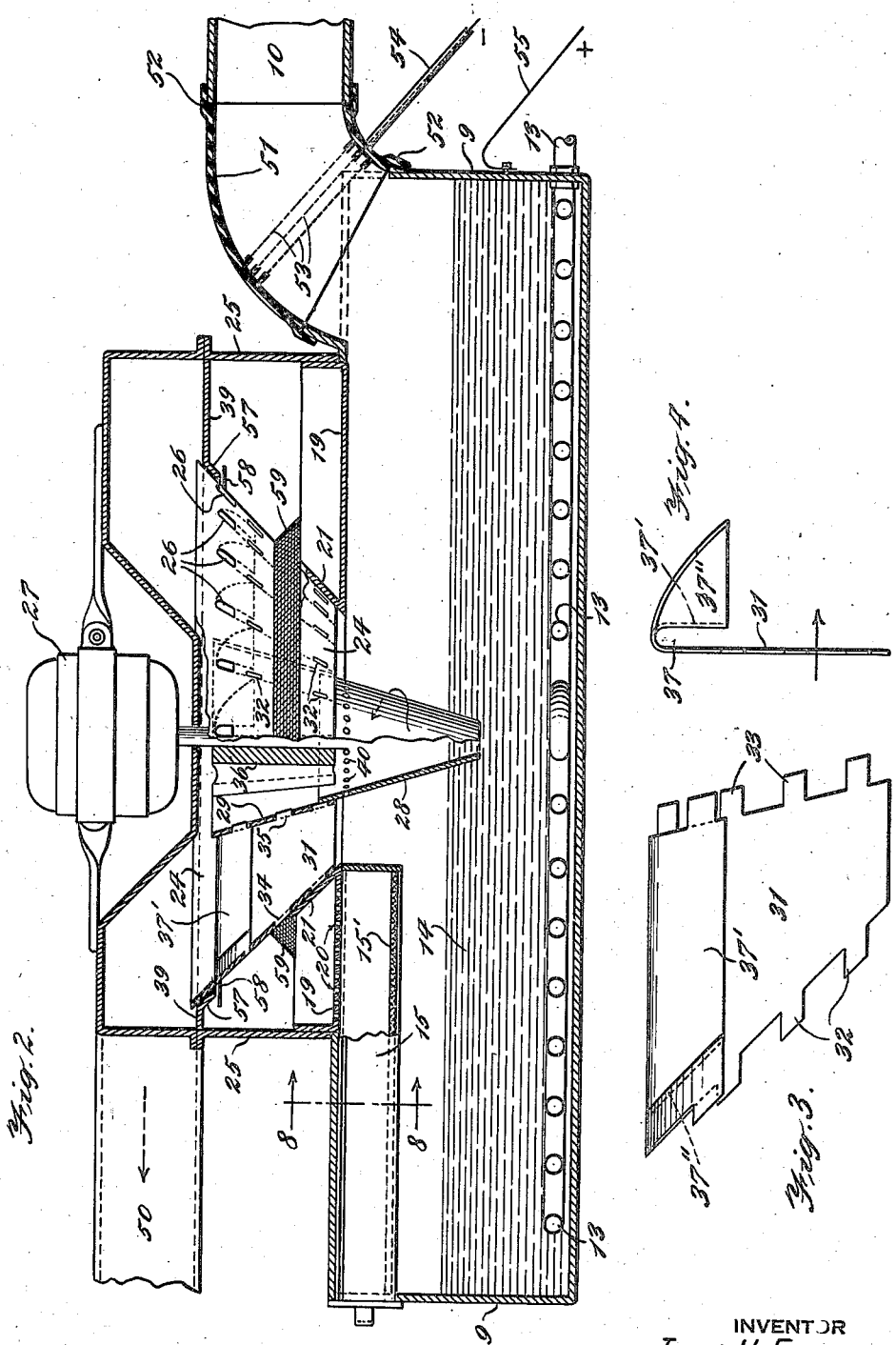

June 24, 1941.  J. H. FEDELER  2,247,119
AIR CONDITIONING APPARATUS
Filed Oct. 27, 1938  3 Sheets-Sheet 3
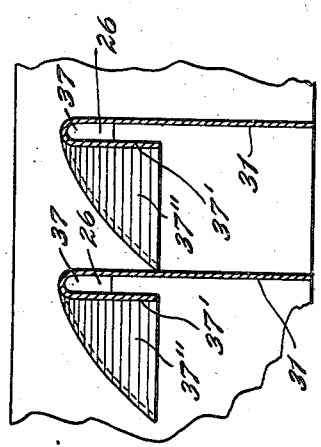
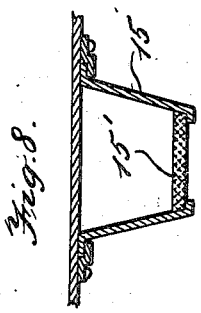
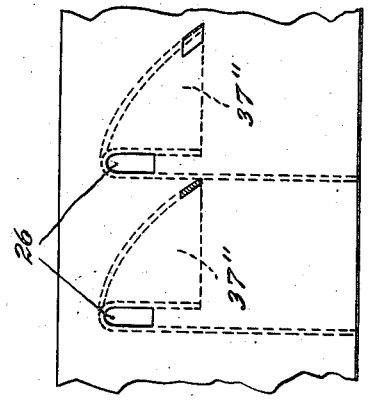
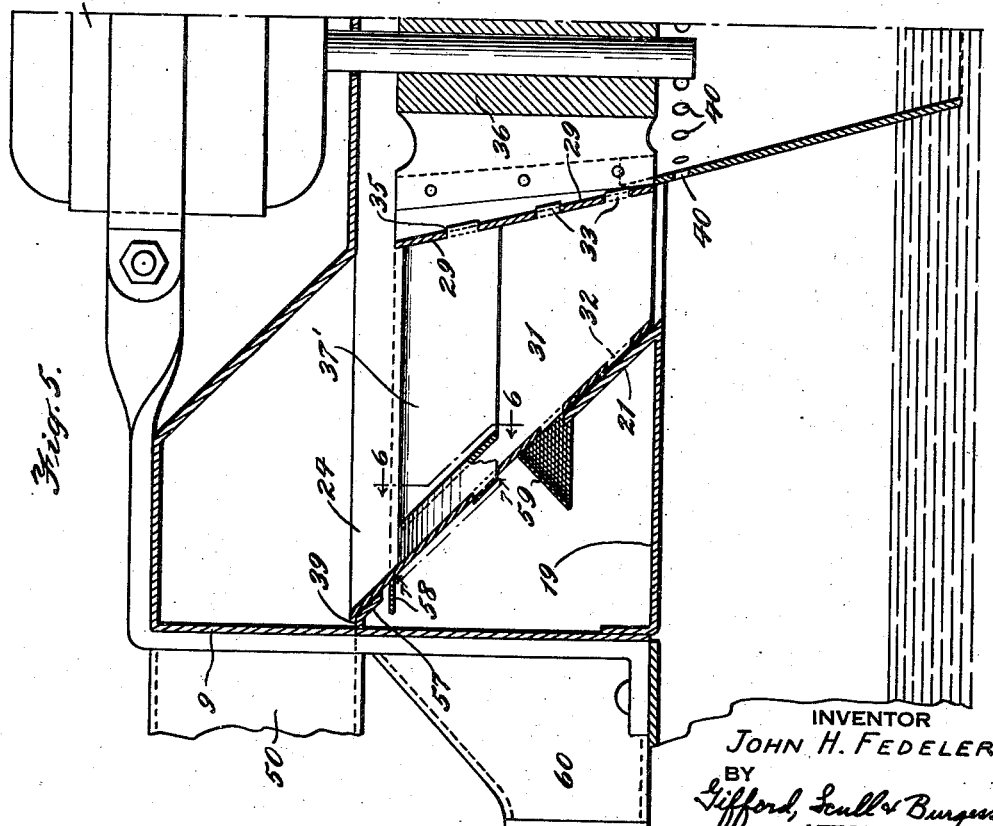
INVENTOR
JOHN H. FEDELER
BY
Gifford, Scull & Burgess
ATTORNEYS Patented June 24, 1941

2,247,119

UNITED STATES PATENT OFFICE 2,247,119

AIR CONDITIONING APPARATUS

John H. Fedeler, New York, N. Y.

Application October 27, 1938, Serial No. 237,172

9 Claims. (Cl. 261—91)

This invention relates to a novel and improved form of air conditioning apparatus, the novel features of which will be best understood from the following description and the annexed drawings, in which I have shown a selected embodiment of the invention and in which:

Fig. 2 is a section approximately on the line 2—2 of Fig. 1, parts being shown in elevation;

Fig. 3 is an elevation of one of the vanes of the blower;

Fig. 4 is a view of the structure appearing in Fig. 3 as seen from the right of that figure;

Fig. 5 is a view approximately on the line 5—5 of Fig. 1;

Fig. 6 is a view approximately on the line 6—6 of Fig. 5;

Fig. 7 is a view approximately on the line 7—7 of Fig. 5;

Fig. 8 is a view approximately on the line 8—8 of Fig. 2.

Figure 1:
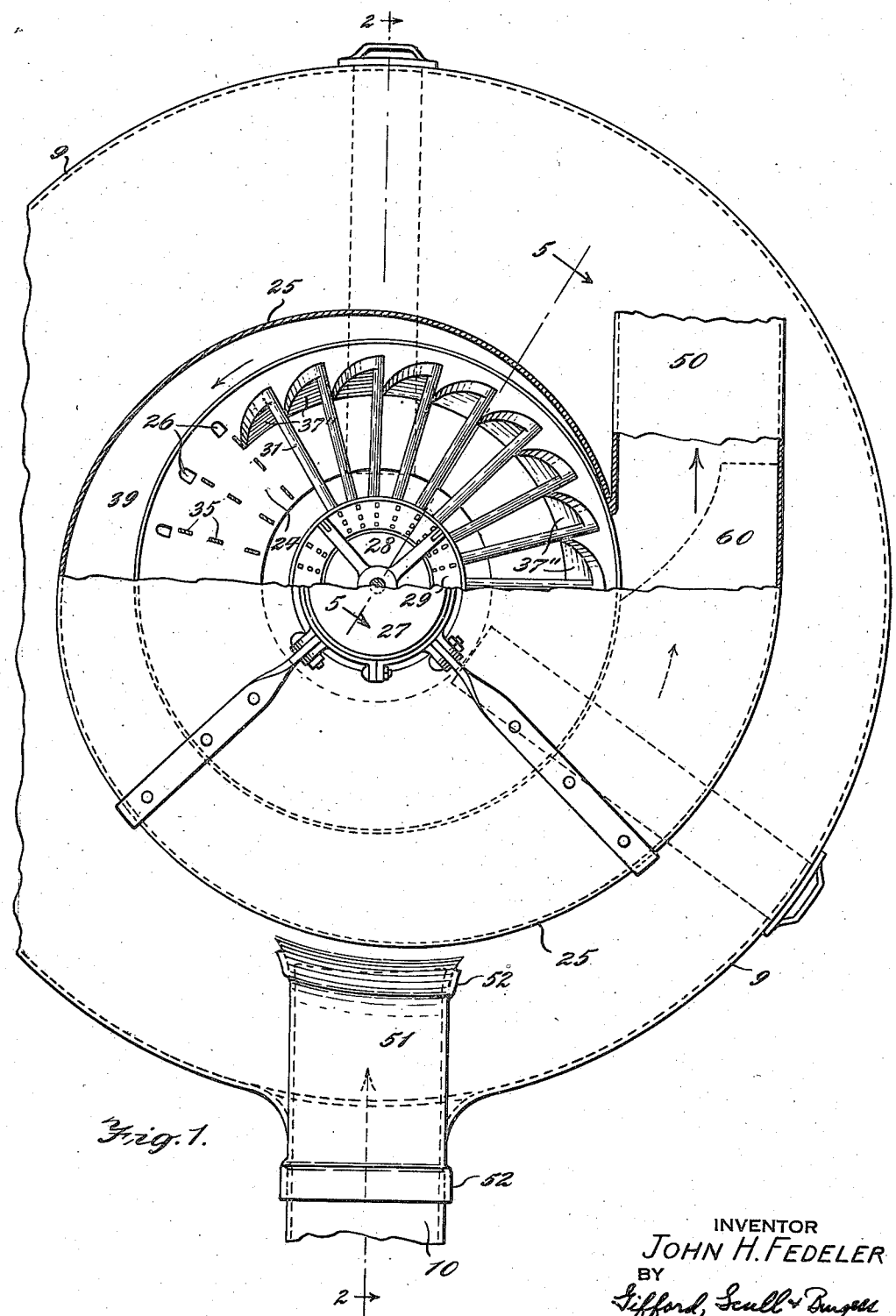
Fig. 1 is a top view of the apparatus with parts thereof removed and other parts shown in section.

The invention is shown as embodied in an apparatus comprising a reservoir in the form of a bottom casing 9 having an inlet 10 through which air may enter the reservoir. Shown in the bottom of the reservoir is a tempering or temperature controlling coil 13 which may be connected to a source of hot water or cold water or any other suitable heating or cooling fluid, in order to vary the temperature of the liquid 14 within the reservoir. This liquid will usually be water, although the invention is not limited thereto. The coil may be connected to any suitable or well-known source of supply for automatically varying the temperature of the liquid 14.

Above the reservoir 9 is supported a casing 25, on the top of which is disposed an electric motor 27 with a shaft which extends downwardly towards the reservoir. On this shaft is secured a rotor which may comprise a spider 36 which is secured to an inverted hollow truncated cone, here shown as being formed, for convenience, of two parts 28 and 29 which may be secured together in any suitable manner to form in effect one cone, with its bottom end open and with that end disposed below the normal level of liquid in the reservoir. Concentric with the inner cone is an outer cone 24 which is shown as secured to the inner cone by means of radially extending vanes 31. These vanes, as shown in Figs. 3 and 4, are preferably formed of sheet metal and are shown secured to the two cones of the rotor by means of lugs 32 and 33 which may extend through suitable holes, as at 34 and 35, in the walls of the two cones.

The rotor will move in the direction indicated by the arrows in Fig. 1, and the front face of each blade is provided at its top edge with a pocket 37 formed by folding over the upper edge of the blade to form a downwardly extending flange 37', as shown. Adjacent the outer cone, this flange is expanded into a larger pocket by extending the flange outwardly or forwardly at right angles to the blade 31, as indicated at 37''.

Within the casing 25 are two horizontally extending walls 19 and 39, these two walls defining between them a chamber, the bottom of which is formed by the wall 19 and the roof of which is formed by the wall 39. The wall 19 is provided with upwardly extending flanges 21 which contact the outer surface of the wall of the outer cone 24 to form a seal, and similarly the wall 39 is provided with a downwardly extending flange 57 for the same purpose. In addition to forming seals, these flanges provide bearings to steady the rotor in its rotation.

The wall of the outer cone 24 is provided with a series of openings 26 in line with the pockets 37 whereby dust and other relatively heavy particles of material which are caught in the pockets 37 and which are forced outwardly by centrifugal force may pass through the wall of the outer cone into the chamber between the walls 19 and 39. This chamber then forms a dust-collecting chamber and the dust will fall to the bottom, where it may pass through holes 20 and be collected in any one of several drawers 15 slidably supported in the top of the reservoir. The bottom of these drawers may be provided with suitable filtering medium 15' so that any moisture in the collected dust may work back into the reservoir. The outer cone is provided with additional sealing means in the form of baffles 58 and 59 overlapping the flanges 57 and 21, respectively. These baffles serve to deflect dust particles away from the spaces between the flanges and the outer cone and to direct those particles toward the bottom of the chamber.

This dust-collecting chamber may have an auxiliary outlet 60 for use when the apparatus is being used to remove cinders or other large particles of foreign matter from the air. This outlet 60 is normally kept closed and when it is being used the holes 20 may be blocked off.

The inner cone is provided preferably at a level below the bottom edges of the blades 31 with a series of holes 40, for a purpose which will be presently described. The upper casing 25 is provided with an outlet 50 from which the conditioned air may be discharged.

If desired, part of the inlet, as shown at 51, may be made of insulating material, such as hard rubber or porcelain, and secured in place by flanges 52. Within this section of the inlet may be disposed metal screens 53 held in place by any suitable means and in such a position that all the air coming through the inlet will pass through these screens. The screens are preferably charged with electricity and for that purpose they may be connected to a high voltage direct current source of electricity by means of an insulating wire 54 leading to one side or hole of the source of current and the other side of this hole or source may be connected to the casing 9 by wire 55. Thus the air coming in at the inlet may be charged to aid in separating the dust particles therefrom.

In operation, the motor may be started, whereupon air will be drawn in at the inlet 10 and discharged at the outlet 50. The lower end of the inner cone will be below the level of liquid in the reservoir and therefore this liquid will work upwardly in the interior of the cone and will be discharged outwardly in a fine spray through the holes 40, it being noted that this spray will be in the path of the air passing between the blades 31. The pockets 37 of the blades will catch the air passing through the blower and the heavier particles will be carried outwardly by centrifugal force until they pass through the holes 26 and then they may be collected in the dust collecting chamber, as previously described. This separation of the dust may be aided by charging the air coming in at the inlet, as described above.

From the above it will be seen that the air conditioning apparatus described herein is one which may be used for conditioning the air either in summer or winter, in that the liquid 14 may be either cooled or heated by the temperature-controlling coil. It will further be seen that the apparatus is very simple and avoids the objectionable feature of filtering the air through a filtering medium, which requires frequent cleaning and which is now generally used in air conditioning apparatus. Instead, the moving air is caused to change its direction at the same time that the dust or other heavy particles are removed. Other advantages will be apparent to those skilled in the art and need not be enumerated.

It is also possible by reversing the direction of rotation of the rotor to collect clean air in the pockets 37 at the top edges of the vanes 31. In such a case air passing out the openings 26 will be clean and carried out the auxiliary outlet 60 and the foreign material carried up and out the outlet 50. When the device is to be so operated it may be desirable to eliminate the large pockets at the ends of the vanes. This style of operation may be advantageous when the apparatus is being used as a cinder collector.

While I have shown the invention as embodied in a specific form, it is to be understood that various changes in details may be made without departing from the scope of the invention as defined by the appended claims.

I claim:

1. In an air conditioning apparatus, a reservoir for liquid, a blower disposed above the normal level of liquid in said reservoir and comprising inner and outer truncated hollow cones disposed with their small ends downward and both rotatable about a vertically extending axis and the small end of the outer cone terminating above said level, vanes extending between said cones, an inlet arranged to discharge air into the space in the reservoir above said level, an outlet from said blower above said cones, and means to rotate said cones about said axis.

2. In an air conditioning apparatus, a reservoir for liquid, a blower disposed above the normal level of liquid in said reservoir and comprising inner and outer truncated hollow cones disposed with their small ends downward and both rotatable about a vertically extending axis and the small end of the outer cone terminating above said level, vanes extending between said cones, an inlet arranged to discharge air into the space in the reservoir above said level, an outlet from said blower above said cones, and means to rotate said cones about said axis, said outer cone having holes in the wall thereof, and a chamber outside said wall to collect dust coming through said holes.

3. In an air conditioning apparatus, a reservoir for liquid, a blower disposed above the normal level of liquid in said reservoir and comprising inner and outer truncated hollow cones disposed with their small ends downward and both rotatable about a vertically extending axis, vanes extending between said cones, an inlet arranged to discharge air into the space in the reservoir above said level, an outlet from said blower above said cones, and means to rotate said cones about said axis, said inner cone having its lower end open and extending below said level of liquid and having holes in its wall at a distance above said level and the lower end of said outer cone being located above said level.

4. In an air conditioning apparatus, a reservoir for liquid, a blower disposed above the normal level of liquid in said reservoir and comprising two truncated hollow cones disposed with their small ends downward and both rotatable about a vertically extending axis, vanes extending between said cones, an inlet to discharge air into the space in the reservoir above said level, an outlet from said blower above said cones, and means to rotate said cones about said axis, said vanes having dust-catching pockets at their upper edges extending to said outer cone, said outer cone having holes therein communicating with said pockets.

5. In an air conditioning apparatus, a rotor comprising an outer wall in the form of a hollow truncated cone, said cone being open at the smaller end and the blower being constructed and arranged to draw air into the cone at that end, a plurality of blades extending inwardly from said wall, said wall having a hole adjacent each blade on the front face thereof and each blade having a dust-collecting pocket lying along said wall and extending substantially from one blade to the next and covering said hole.

6. In an air conditioning apparatus, a reservoir for liquid having an air inlet above the level of said liquid, a blower disposed above the normal level of liquid in said reservoir comprising a truncated cone having its small end downward and being rotatable about a vertically extending axis, vanes extending radially between said axis and said cone, said vanes having dust-catching pockets at their upper edges extending to said cone, said cone having holes therein communicating with said pockets, a dust-receiving chamber surrounding said cone and communicating with said holes, means to rotate said cone, and an outlet for clean air from said blower above said cone.

7. In an air conditioning apparatus, a reservoir for liquid having an air inlet above the level of said liquid, a blower disposed above the normal level of liquid in said reservoir comprising a truncated cone having its small end downward and being rotatable about a vertically extending axis, vanes extending between said axis and said cone, said vanes having dust-catching pockets at their upper edges extending to said cone, said cone having holes therein communicating with said pockets and with a dust-receiving chamber surrounding said cone and communicating with said holes, means to rotate said cone, an outlet for clean air from said blower above said cone, means for spraying liquid across the lower opening of said cone, and a temperature controlling coil in said reservoir.

8. In an air conditioning apparatus, a reservoir for liquid having an air inlet above the level of said liquid, a blower disposed above the normal level of liquid in said reservoir and comprising two truncated hollow cones disposed with their small ends downward and both rotatable about a vertically extending axis, the inner of said cones extending into the liquid in said reservoir and having a series of encircling holes located part way up said cone permitting the liquid to be sprayed in contact with air entering the outer cone, vanes extending between said cones, said vanes having dust-catching pockets at their upper edges extending to the outer cone, said cone having holes therein communicating with said pockets and with a dust-receiving chamber, means to rotate said cones, and an outlet from said blower above said cones.

9. In an air conditioning apparatus, a reservoir for liquid having an air inlet above the level of said liquid, a blower disposed above the normal level of liquid in said reservoir and comprising two truncated hollow cones disposed with their small ends downward and both rotatable about a vertically extending axis, the inner of said cones extending into the liquid in said reservoir and having a series of encircling holes located part way up said cone permitting the liquid to be sprayed in contact with air entering the outer cone, vanes extending between said cones, said vanes having dust-catching pockets at their upper edges extending to the outer cone, said cone having holes therein communicating with said pockets and with a dust-receiving chamber, means to rotate said cones, an outlet from said blower above said cones, and an electrical means in said inlet and connected to the vanes of the blower whereby the dust particles passing through said inlet and the vanes in said blower are charged so as to be attracted to each other.

JOHN H. FEDELER.